June 13, 1967 J. OLSON 3,324,959
TREE ROOT CUTTERS
Filed March 30, 1965 2 Sheets-Sheet 1
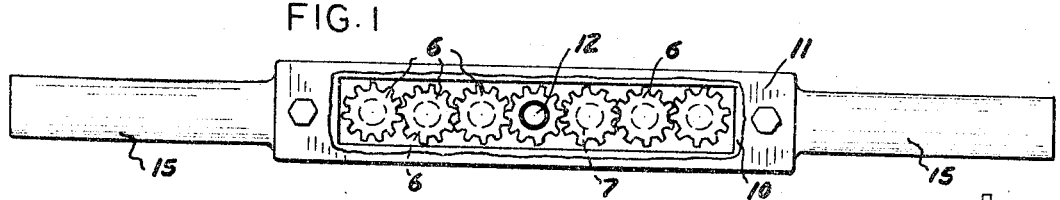
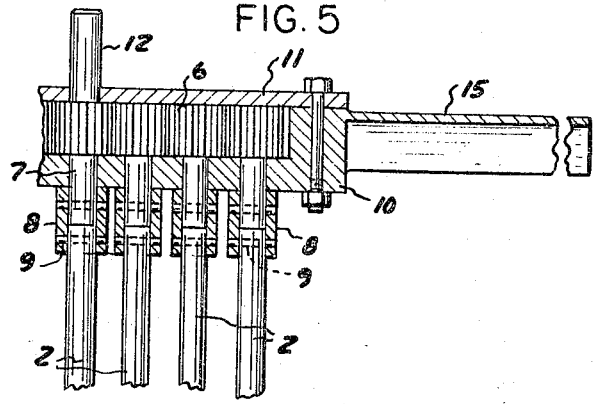
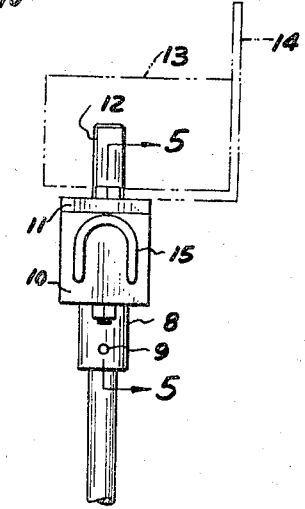
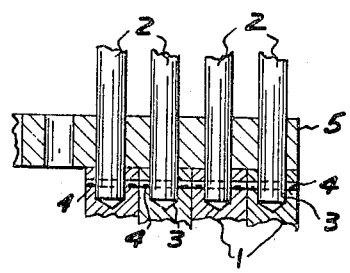
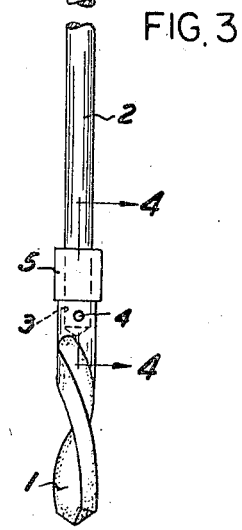
INVENTOR
JOHN OLSON
BY *J.S. Murray*
ATTORNEY June 13, 1967 J. OLSON 3,324,959
TREE ROOT CUTTERS
Filed March 30, 1965 2 Sheets-Sheet 2

INVENTOR
JOHN OLSON
BY J.S. Murray
ATTORNEY

United States Patent Office 3,324,959
Patented June 13, 1967

3,324,959
TREE ROOT CUTTERS
John Olson, 455 Marlborough, Detroit, Mich. 48215
Filed Mar. 30, 1965, Ser. No. 443,792
1 Claim. (Cl. 175—108)

ABSTRACT OF THE DISCLOSURE

A row of tangentially interengaged, fluted drills secured to stems which are elongated upwardly so that each stem is engaged and driven by a gear of a gear train, the gears are mounted in a housing having a handle extending oppositely on each side thereof. The gear train is housed in said housing, and one of said stems extends upwardly through said gear train and said housing to receive a drive, as from an electric motor.

Summary of invention

This invention relates to cutting implements and particularly those equipped with a set of drills for underground cutting, and thus especially suited for severing tree roots, such as commonly remain after sawing or chopping down a tree.

Such roots are commonly a nuisance, detracting from the appearance of a lawn or other grounds, impeding use of lawn mowers, and often becoming a source of sprouts.

An object of the invention is to provide a portable implement comprising a set of rotative drills or bits disposed substantially upright in use, so that by raising or lowering the implement such drills may be withdrawn from the ground or may penetrate the later and effect a root-cutting operation.

Another object is to tangentially interengage the drills, so that the holes which they individually form will substantially intercommunicate, and substantially no chips or other severed material will be left between the drills.

Another object is to rigidly mount the respective drills on the lower ends of a corresponding set of stems and to provide for rotating the stems in unison, thus driving the drills, and to adapt a reinforcing bar to slide up and down on the stems, resisting any tendency of the latter to flex responsive to working stresses.

These and various other objects are attained by the construction hereinafter described and illustrated in the accompanying drawings, wherein:

FIG. 1 is a top plan view of the illustrated implement, the cover of a gear housing being in part broken away to partially uncover a gear train operating in such housing.

FIG. 3 is an end elevational view of the implement.

FIG. 4 is a fragmentary vertical sectional view, as indicated by the line 4—4 of FIG. 3, this view particularly showing a coupling such as serves to mount each drill on the lower end of its stem.

FIG. 5 is a fragmentary vertical sectional view of the drive connection from one of the gears of the implement to a corresponding stem, such view being taken on the line 5—5 of FIG. 3.

Figure 2:
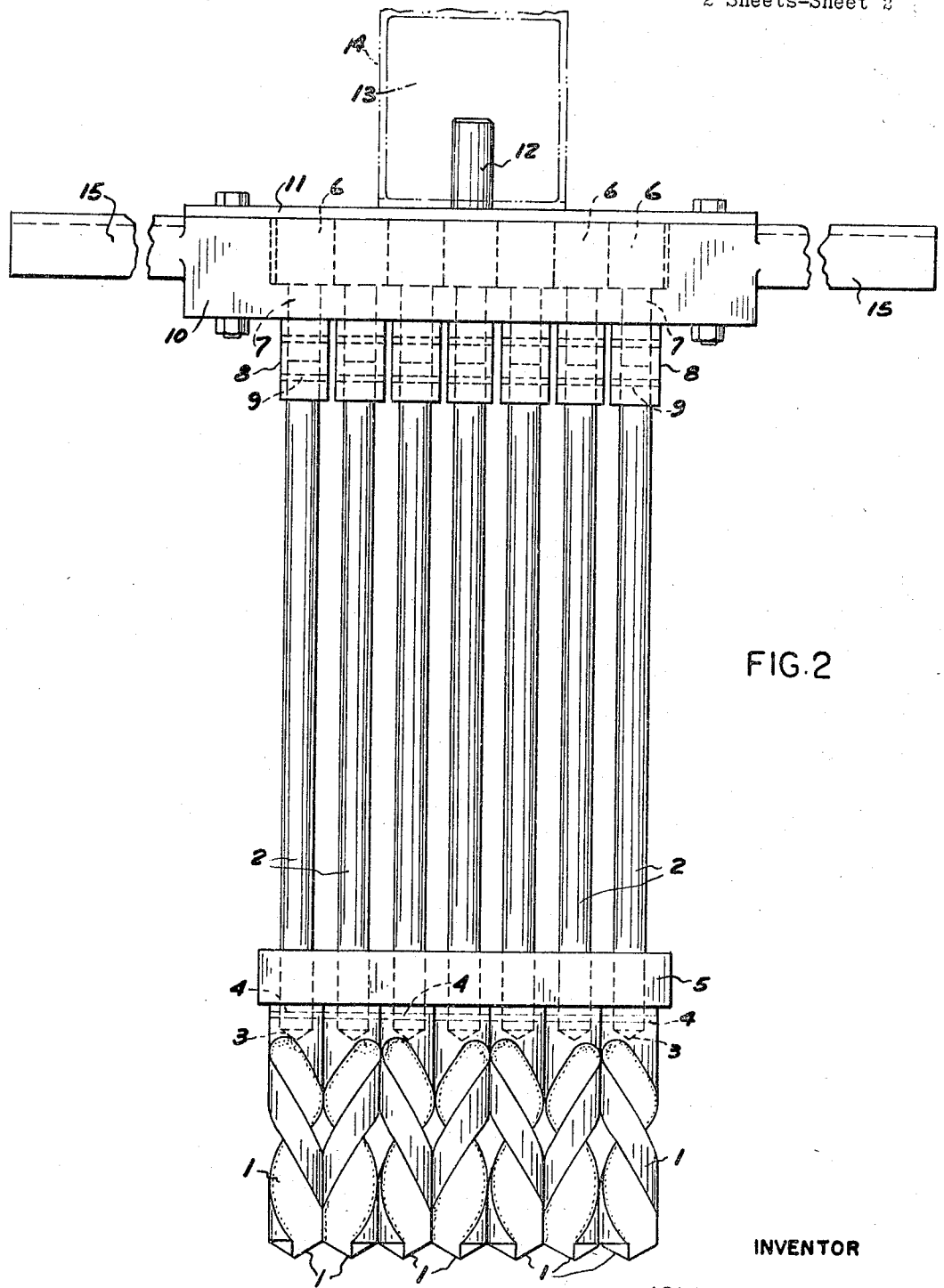
FIG. 2 is a front or rear elevational view of the implement.

In these views, the reference character 1 designates a row of parallel drills, which are preferably tangentially interengaged and are upright in use or approximately so. Rigidly extending upwardly from each drill is a stem 2 of less diameter than the drills and driving the latter, the drills having sockets 3 receiving the lower ends of the stems, said ends being firmly pinned in the sockets, as indicated at 4. Slidable up and down on the stems, is a reinforcing bar 5 which, in its lowermost position, seats on the upper ends of the drills, as best seen in FIGS. 2 and 3, said bar resisting any tendency of the stems to flex transversely thereof to a material extent.

The stems 2 are rotatively driven preferably at equal speeds by a train of spur gears 6, each formed axially thereof with a downwardly extending stud shaft 7, the several stud shafts being aligned with the respective stems. Preferably, a collar 8 snugly receives each stem and also the aligned studs 7, and a pair of pins 9 extending diametrically through each collar and the corresponding stem and stud shaft complete the connection. The gears 6 are set into a housing 10, which has a cover plate 11 removable to give access to said gears, and the centermost gear of the train has an upstanding stub shaft 12 having a driven relation to an electric motor 13 or some other source of power. As illustrated, said motor is fixed on a bracket 14 suitably upstanding from the housing 10.

To facilitate locating the described implement in proper relation to roots requiring severing and to permit applying an adequate downward pressure to the implement, it is preferred to rigidly form a pair of aligned handles 15 on the housing 10, projecting rigidly and oppositely from said housing.

Due to reverse rotation of each two tangentially abutting drills, their cutting effect will be substantially twice that which would derive from applying the same direction of rotation to all the drills, since they exercise as greater cutting force when arranged as disclosed.

When the bar 5 encounters the ground due to downward feeding of the implement, said bar will progessively slide upwardly on the stems 2, thus affording a considerable additional depth of cut.

By arranging the several drills in a row, as described and shown, they supplement each other somewhat like the teeth of a saw and hence compensate for the fact that a saw or axe cannot, in general, exercise its function beneath the ground surface.

By leaning forwardly and downwardly on the handles 15, as gripped by a user of the implement, a considerable down pressure may be applied to the drills, and such pressure may be readily controlled, according to the direction and amount of local stresses.

Portable multiple drills, as heretofore designed, have unduly heavy frames, and it is to be noted that the relatively light gear housing 10 serves as a frame in my construction.

What I claim is:

A root cutting implement comprised of parallel elongated, fluted drills disposed in substantially tangential interengagement a row of parallel stems respectively aligned with and upwardly elongated from said drills, and spaced apart transversely of said stems, sockets formed in the uppermost end of said drills to receive the lower end portion of said stems, and means to secure said lower end portions in said sockets, a housing journalling the upper ends of the stems to turn on a longitudinal axis, a train of gears rotatably mounted in said housing, and respectively rigidly having a driving interconnection with the upper end portion of said stems, a power source carried on said housing, and means interconnecting said power source with said gear train to apply a rotative drive to said gear train and said rigidly interconnected stems, and drills, handle means extending from and rigidly secured to said housing, and a bar mounted on and journalling said stems, and having a normal position of rest at the upper end of the drills, and being slidable longitudinally of the stems to engage the surface of ground being drilled, whereby said drills are constantly held in parallel relationship as said stems descend through said bar and into the ground.

References Cited

UNITED STATES PATENTS

| | | | |
|---|---|---|---|
| 591,449 | 10/1897 | Blair | 175—91 X |
| 1,638,361 | 8/1927 | Pedulla | 175—91 |
| 2,090,355 | 8/1937 | Miller | 175—108 |
| 3,025,917 | 3/1962 | Knoblauch | 175—18 |
| 3,032,126 | 5/1962 | Rexine | 175—18 |

FOREIGN PATENTS

| | | |
|---|---|---|
| 999,860 | 10/1951 | France. |
| 570,749 | 11/1933 | Germany. |
| 1,021,306 | 12/1957 | Germany. |

CHARLES E. O'CONNELL, *Primary Examiner.*

DAVID H. BROWN, *Examiner.*